July 26, 1955 R. J. FAY 2,713,833
DOUGH EMBOSSER
Filed May 20, 1953 4 Sheets-Sheet 1
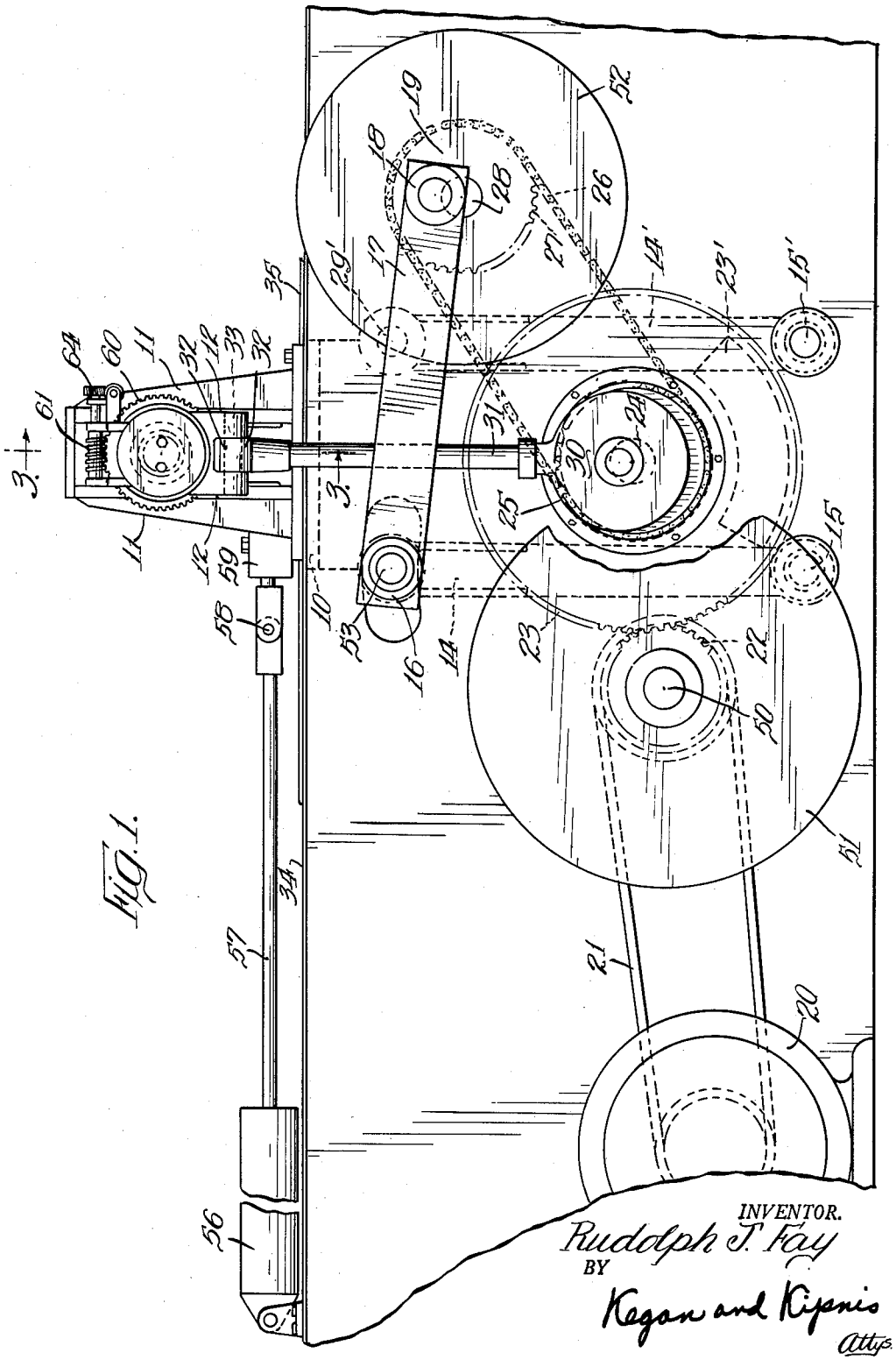
INVENTOR.
Rudolph J. Fay
BY
Kegan and Kipnis
Attys.

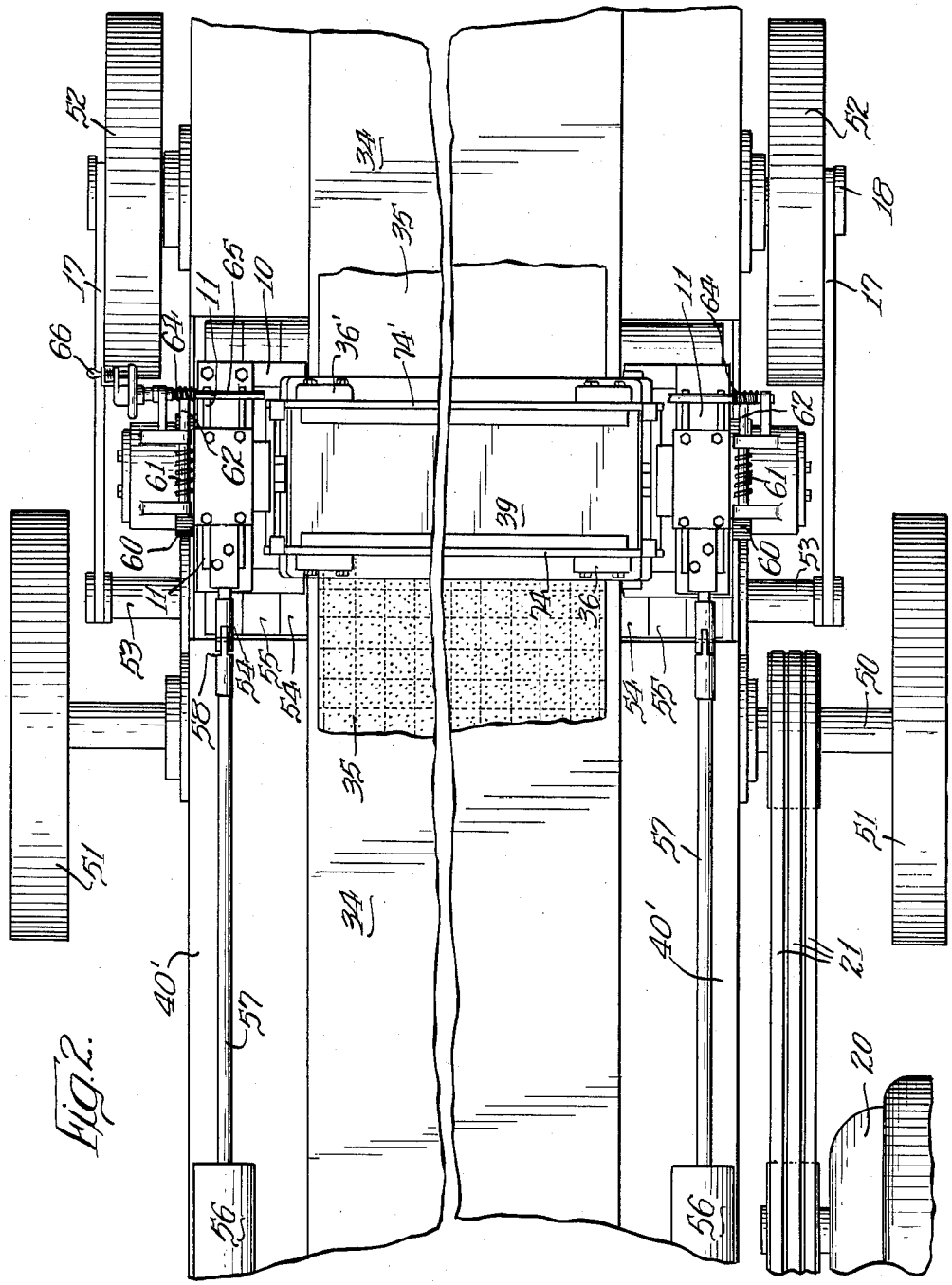

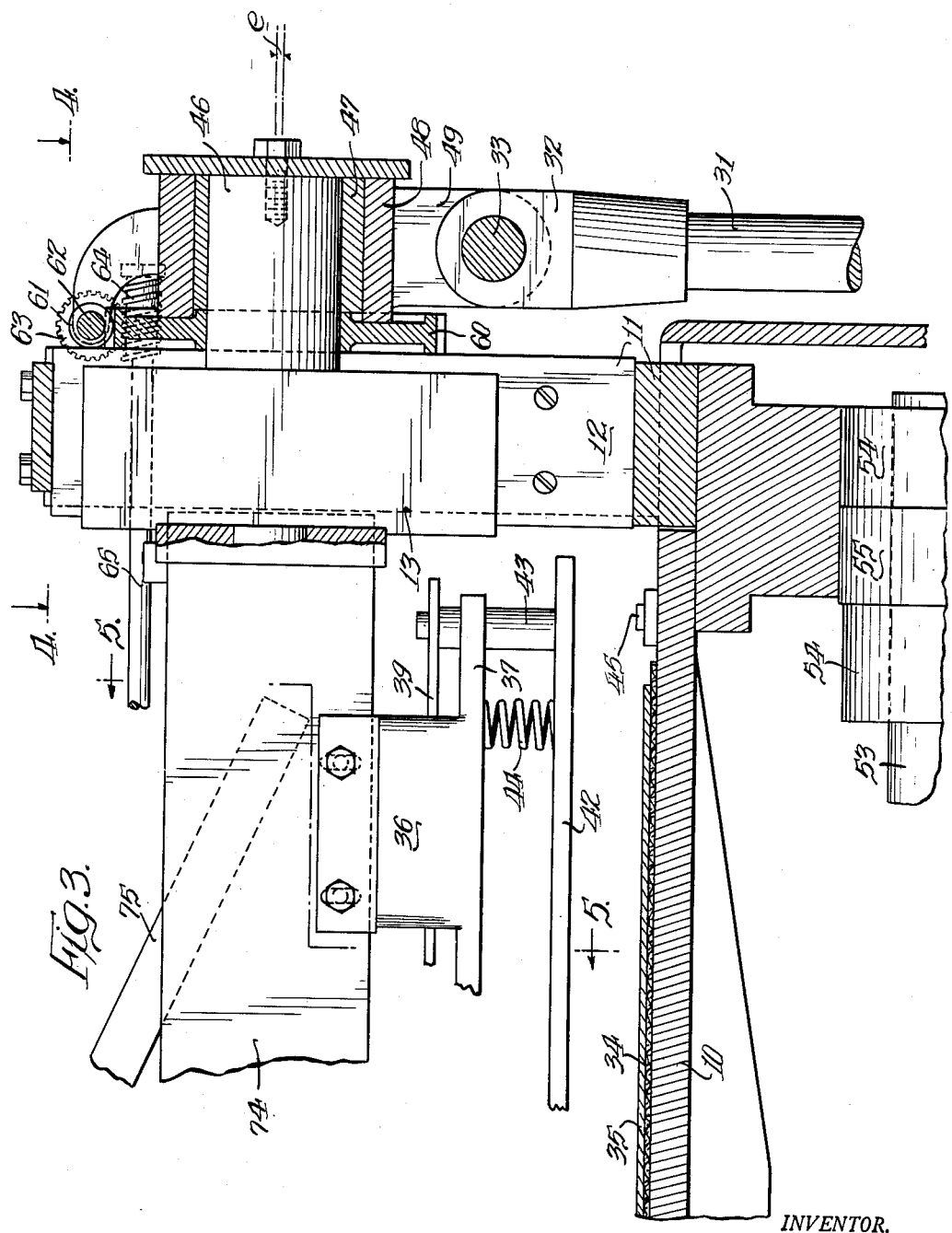

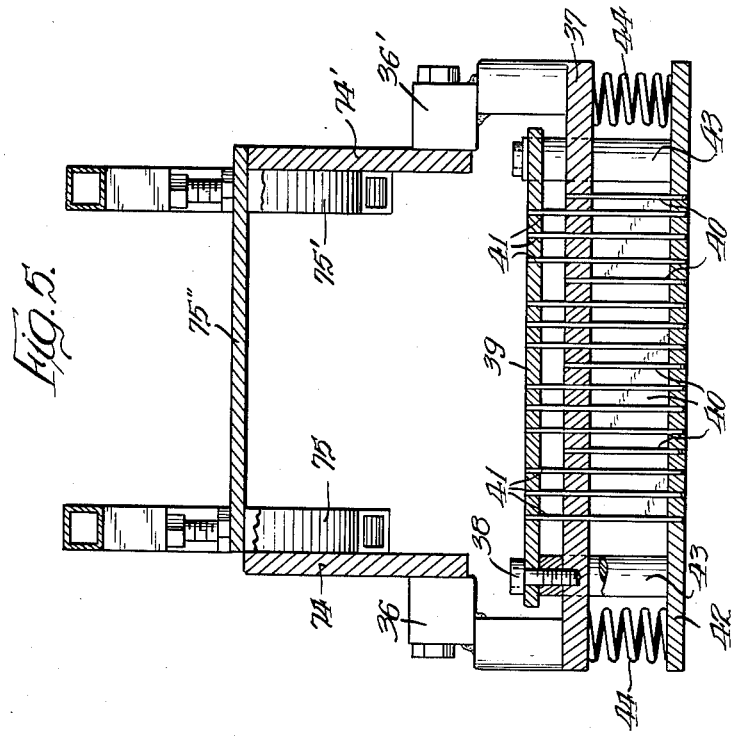
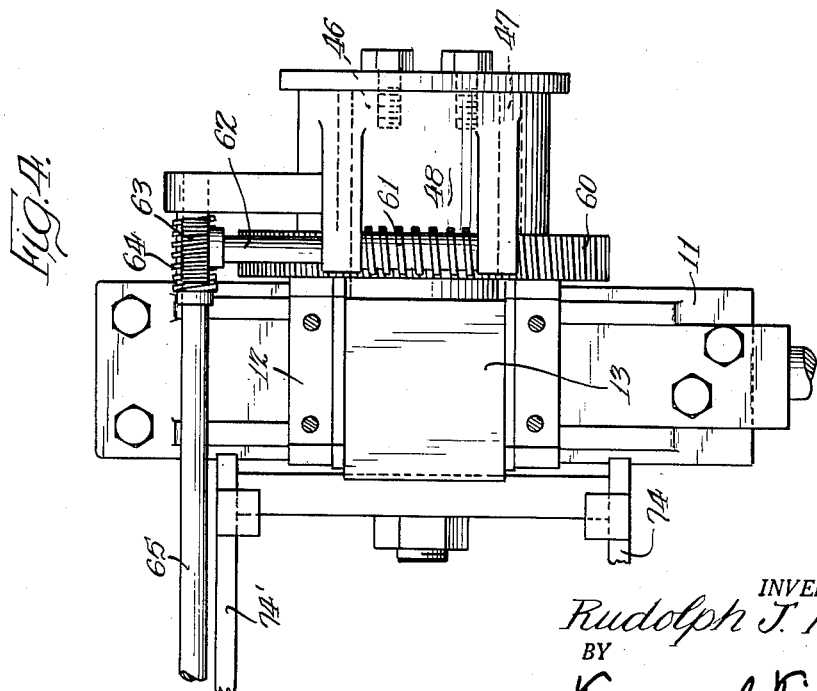
INVENTOR.
Rudolph J. Fay
BY
Kegan and Kipnis
Attys.

United States Patent Office 2,713,833
Patented July 26, 1955

2,713,833

DOUGH EMBOSSER

Rudolph J. Fay, Villa Park, Ill., assignor to Schulze and Burch Biscuit Co.

Application May 20, 1953, Serial No. 356,237

2 Claims. (Cl. 107—7)

This invention relates to apparatus for impressing a traveling sheet of dough with a pattern of indentations for subsequent use in the division of the dough into individual units, such as crackers, biscuits or the like, before the dough has been baked.

More particularly, this invention relates to that type of apparatus for impressing a traveling sheet of dough with a pattern of indentations in which a carriage carrying a cutter head is reciprocable horizontally and said cutter head is reciprocable relative to the carriage in vertical direction.

Conventional machines of the kind mentioned are of substantial weight and when operated at high speeds they are subject to vibrations which may cause the breakdown of elements of the machine, particularly of elongated elements, e. g. links or rods, used in the transmission of motion from the source of power to the carriage on the one hand and to the cutter head on the other.

Another difficulty frequently encountered with conventional machines of the kind referred to is that after limited periods of operation the individual indentations produced in the dough by the cutting tools, instead of being all of equal depth along the width and length of the sheet of dough, are shallower in some parts of said width than in others.

The present invention has for one of its objects the provision of an apparatus for impressing a traveling sheet of dough with a pattern of indentations which apparatus, even though it is of the general type above mentioned, has a greatly reduced tendency to vibrate during operation as compared with prior art machines of that general type.

Another object of the invention is to provide an apparatus of the kind referred to which can be operated at higher speeds than the prior art machines of the general type mentioned.

More specifically it is an object of the invention to provide an apparatus of the kind referred to having vibration damping means for the carriage and other vibration damping means for the cutter head.

A further object of the invention is to provide an apparatus of the kind referred to wherein the reciprocating movements of the carriage and the cutter head in substantially horizontal directions, as well as the reciprocating movements of the cutter head in substantially vertical directions, are subjected separately to the speed change modifying influences of at least one flywheel and at least one shock absorber.

Another object of the invention is to provide an apparatus of the kind referred to wherein the cutter head is adjustable as to its inclination relative to the sheet of dough in a plane transverse to the direction of the travel of said dough.

Other objects of the invention will appear as the description proceeds, reference being had to the accompanying drawings, in which:

Fig. 1 is a fragmentary side elevational view of a dough impressing apparatus embodying the invention;

Fig. 2 is a plan view to Fig. 1;

Fig. 3 is a vertical sectional view taken along the line 3—3 in Fig. 1, Fig. 3 being drawn at a larger scale than Fig. 1;

Fig. 4 is a fragmentary plan view taken in the direction of the arrows 4—4 in Fig. 3; and Fig. 5 is a fragmentary vertical sectional view taken along the line 5—5 in Fig. 3.

In the drawings, the reference numeral 10 denotes a horizontally reciprocable carriage which carries at each end of its width a cutter head guide 11. Guided in vertical slide-ways 12 provided in the cutter head guides 11 is a vertically reciprocable cutter head 13. A belt conveyor 34 of conventional construction adapted to travel in horizontal direction serves to continuously feed a sheet of dough 35 between the carriage 10 and the cutter head 13.

The horizontal reciprocating movement of the carriage 10 and the parts carried thereby is brought about by a swinging movement of at least one pair of parallel links 14 and 14' which are pivotally mounted at their lower ends 15 and 15' in a side wall or frame 40' of the machine. The two links 14 and 14' are of equal length and their pivotal ends 15 and 15' are situated in a horizontal line. Linked at one end to the upper end 16 of one of the links 14, 14' is a link 17 whose other end is connected to a stub shaft 18 on an eccentric disc 19. The eccentric 19 is operable from a motor 20 through the intermediary of one or several belts or chains 21, a pair of gear wheels 22 and 23, and one or more sprocket wheels 25 connected by one or more chains 26 to one or more sprocket wheels 27 secured to a shaft 28 which is connected through the eccentric 19 to the stub shaft 18 and thereby to the link 17. The gear wheel 22 is mounted on a shaft 50 carrying a flywheel 51. The wheel 23 carries a counter weight 23' for the cutter heads 13 and parts thereon, and is mounted on a shaft 24.

For the connection of the upper end of one of the links 14, 14' to the link 17, said upper end of the link 14 is bifurcated, ending in two bearing sleeves 54 through which and through a bearing sleeve 55 secured to the carriage 10 there extends a pin 53, as best shown in Fig. 3.

The vertical reciprocating movement of the cutter head 13 is caused by a second eccentric 30 driven by the above mentioned shaft 24. The eccentric 30 is connected to the cutter head 13 by means of a rod or link 31. The upper end 32 of the link 31 is in the form of a sleeve surrounding a pin 33 carried by the cutter head 13. Upon the eccentric 30 being driven by the motor 20, the link 31 moves the cutter head 13 up and down.

The eccentrics 19 and 30 are preferably both provided in pairs, there being one eccentric 19 and one eccentric 30 arranged at each side of the width of the machine. The previously described interconnections 25, 26 and 27 between the eccentrics 19 and 30 may be common for the eccentrics on both sides of the machine, in which case the shafts 24 and 28 may extend over the entire width of the machine.

A dashpot or other shock absorbing element 56, preferably at each side of the width of the machine, serves, together with the flywheel 52, to smoothness the movements of the carriage and of the elements moving therewith by making the accelerations and decelerations of these movements more gradual than they would otherwise tend to be. Each dashpot 56 has a plunger rod 57 pivotally connected at 58 to a forward extension 59 of one of the cutter head guides 11.

The counter-balancing weight 23' carried by the gear wheel 23 serves, together with the flywheel 51, to moderate the accelerations and decelerations of the vertical movements of the cutter head 13.

The cutter head 13 comprises two vertical side plates 74 and 74' held together by bracings 75, 75' and 75" (Fig. 5). Extending downwardly from the plate 74 and 74' are clip members 36 and 36' carrying a horizontal plate 37 to which another horizontal plate 39 is secured and superimposed by means of screws 38. The lower plate 37 carries vertical cutter blades 40 extending in two vertical planes which are perpendicular to each other. It is the purpose of these cutter blades to indent in the dough the lines along which this dough, after the baking thereof, is separated into units of the desired size. The upper plate 39 carries depending fingers 41 whose purpose it is to produce dimples or holes in the dough. Since the plates 37 and 39 are screwed together, the cutter blades 40 and the fingers 41 move in unison. Both the cutter blades 40 and the fingers 41 are guided in cut-outs of a horizontal stripper plate 42 which carries upwardly extending posts 43 on which the plates 37 and 39 are guided. Springs 44 arranged between the plates 37 and 42 tend to hold these plates at a given distance from each other.

Stops 45, which may be resilient stops, e. g. rubber stops, are provided on the top of the carriage 10 to restrain the downward movement of the stripper plate 42 after the cutter head has been moved down a certain distance by the link or links 31 (Fig. 3). Whereas the stripper plate 42 is prevented from further downward movement by the stops 45, the plates 37 and 39 together with their tools 40 and 41 continue to move downwardly until the front ends of the tools 40, 41 have advanced into the dough 35. During this movement of the tools 40, 41 relative to the stripper plate 42 the springs 44 are being compressed and thereby biased for re-establishing the initial distance between the plates 37 and 42 at such later time when the link or links 31 are pushing the cutter head 13 back to its raised position.

The construction of the cutter head 13 and parts thereon are such that the center of gravity of the vertically moving parts is located above but relatively close to the points of connection 53 between the links 14, 14' and the carriage 10. This arrangement aids in holding vibration of the cutter head guides 11 on the carriage 10 in horizontal planes to a minimum.

The movements of the carriage 10, of the cutter head 13 carrying the indenting tools 40, 41, and of the conveyor 34 carrying the sheet of dough 35 are so correlated in known manner that the cutter head 13 performs its downward stroke substaintially at the start of the forward stroke of the carriage 10 and its upward stroke during the rearward stroke of the carriage 10, and there is substantially no horizontal, relative movement between the carriage 10, the tools 40, 41, and the conveyor 34 during the time the tools 40, 41 are penetrating into and withdrawing from the travelling sheet of dough. With such correlation of the several motions, the dough impressing machines as hitherto used showed strong vibrating tendencies in horizontal as well as vertical directions. In the new machine this tendency is greatly reduced and the dough indentation is more uniform as well as safer.

This has been achieved largely by making the reciprocating movements in both directions more gradual by the devices previously described, that is to say by the combination of (A) the flywheels 52 and the shock absorbers (e. g. dashpots 56) connected to the horizontally reciprocating carriage and elements associated with the latter, with (B) the flywheels 51 and the shock distributors (e. g. counter-balancing weight 23') connected to the vertically as well as horizontally reciprocating cutter head 13 elements associated with this cutter head. The vibrating tendency of the machine and the stresses and strains upon its moving parts being thus greatly diminished, the machine can be operated at speeds that would have been harmful to the hitherto used constructions. For instance, a speed of 200 cycles per minute has been found to be perfectly safe.

While the machine equipped with the invention as described so far has a greatly diminished tendency to vibrate, even these diminished vibrations may, in the course of time, cause inequalities in the depth of the indentations produced in the dough by the cutting tools 40, 41, as has been mentioned among the difficulties of conventional machines. The present invention takes care of this possibility by the following arrangement (Figs. 3 and 4):

The cutter head 13 carries at each of its both ends a sidewardly extending stud shaft 46. On each of these stub shafts there is rigidly mounted an eccentric sleeve 47 which, in turn, is surrounded by a sleeve 48 carrying a downwardly extending bearing 49 for the shaft 33. The stub shaft 46 carries further a worm wheel 60 which is in engagement with a worm 61 on a shaft 62. A pinion 63 on the shaft 62 meshes with a worm 64 on a shaft 65 operable manually by means of a crank 66 (Fig. 2). Turning of the hand crank 66 rotates the worm 64 and thereby the pinion 63, the shaft 62, the worm 61 and the wheel 60. The wheel 60 being connected through the stub shaft 46 to the eccentric sleeve 47, the latter changes its angular position relative to the vertical plane through the axis of the stub shaft 46 when the wheel 60 is turned in one direction or the other, depending on the direction in which the crank 66 is being turned. Thereby, the sleeve 48 is raised or lowered for a smaller or larger amount, as desired, the maximum being equal to the eccentricity of the sleeve 47, indicated in Fig. 3 by the distance $e$. The shaft 33 which is carried by the downward extension 49 of the sleeve 48 is thereby correspondingly raised or lowered. Thus, by turning the hand crank 66, that end of the cutter head which is next to this hand crank becomes raised or lowered and thereby the cutter head becomes adjusted to the necessary extent as to its inclination relative to the sheet of dough 35 in a plane transverse to the direction of the travel of said dough. In this manner, the cutter head 13 can be tilted into a position in which the one end of the side plates 74, 74' of the cutter head 13 is slightly closer to the plane of the carriage 10 than the other end of these side plates.

It will be obvious from the foregoing, that if at any time the indentations produced by the tools 40, 41 are shallower at one end of the width of the cutter head 13 than at the other end, equality of the depth of all the indentations can be restored by operating the hand crank 66 to such an extent and in such direction that the end of the width of the cutter head 13 below which the shallower indentations have appeared is moved closer to the sheet of dough for the amount required in each particular case. After such adjustment, the cutter head 13 will again produce indentations whose depth is equal from one end of the width of the dough to the other. Preferably, the depth of the indentations is checked periodically so that any dislocation of the cutting tools caused by the vibrations of the machine is detected at an early stage at which the readjustment can be performed while the product is still fairly uniform.

While I have shown in the drawings one particular embodiment of the invention, I desire it to be understood that this embodiment has been given by way of example only, since various changes in and modifications of the details of the construction shown may be made without departing from the spirit of the invention or the scope of the appended claims.

What I claim is:

1. A machine for impressing a traveling sheet of dough with a pattern of indentations for subsequent use in dividing said sheet of dough into individual units after the baking of the dough, comprising a supporting base, a horizontally moving conveyor belt on said base for supporting the sheet of dough, a frame extending upwardly above said belt on each side of the belt, a belt supporting carriage on said frame and extending below said belt, two vertically extending links pivotally mounted on said base, one on each side of said belt, each link pivotally connected to said carriage at the upper end of said link to support the carriage for horizontal reciprocation in the direction of belt travel and oppositely thereto, a first pair of flywheels rotatably carried by said base, one on each side of the belt, two eccentric pins, one on each flywheel of said first pair of flywheels, two connecting links, one on each side of the belt, connecting said pins and said carriage, to reciprocate the carriage with the belt travel during half the cycle of said first pair of flywheels and opposite to the belt travel during the other half of said cycle, a driving motor, a second pair of flywheels rotatably carried by said base, one on each side of the belt, an operative drive connection between said motor and the second pair of flywheels, a counterbalanced wheel rotatably mounted on the base, a pair of eccentrics rotatable with the counterbalanced wheel and positioned one on each side of said belt, driving connections between said second pair of flywheels and said counterbalanced wheel, a vertically sliding cross head slidably mounted on said frame, embossing means carried by said cross head for engaging the sheet of dough at the end of each down stroke, a second pair of connecting links, one on each side of said belt, pivotally connecting each end of said cross head with one of the eccentrics, the cycle of operation being set so that the carriage moves with and below said belt at the moment of engagement of said embossing means with the sheet of dough at the end of each down stroke of the carriage, whereby the dough may progress at a uniform high speed on the belt while being impressed periodically by said embossing means.

2. A machine for impressing a traveling sheet of dough as descrbed in claim 1, and further including a second pair of pins, one on each end of the cross head, a pair of eccentric sleeves, one on each said cross head pin, each sleeve being operatively connected with one of the second pair of connecting links, and manual means for rotating said sleeves to adjust the vertical stroke of each side of the cross head to predetermine the depth of embossment in said dough.

References Cited in the file of this patent

UNITED STATES PATENTS

| | | |
|---|---|---|
| 665,214 | Harrington | Jan. 1, 1901 |
| 1,677,180 | Green et al. | July 17, 1928 |
| 1,784,432 | Green | Dec. 9, 1930 |
| 2,576,533 | Ott | Nov. 27, 1951 |

OTHER REFERENCES

Knight's Mechanical Dictionary published in Boston by Houghton, Mifflin and Company, 1882.